SYNCHRONIZED RELAXATION OSCILLATOR

Filed Sept. 9, 1947 2 Sheets-Sheet 1

INVENTOR.
ROBERT C. MOORE
BY
Brown, Denk & Synnestvedt
AGENTS

Jan. 16, 1951 R. C. MOORE 2,538,261

SYNCHRONIZED RELAXATION OSCILLATOR

Filed Sept. 9, 1947 2 Sheets-Sheet 2

INVENTOR.
ROBERT C. MOORE
BY
Brown, Denk & Synnestvedt
AGENTS

Patented Jan. 16, 1951 2,538,261

UNITED STATES PATENT OFFICE 2,538,261

SYNCHRONIZED RELAXATION OSCILLATOR

Robert C. Moore, Erdenheim, Pa., assignor to Philco Corporation, Philadelphia, Pa., a corporation of Pennsylvania Application September 9, 1947, Serial No. 773,035

8 Claims. (Cl. 250—36)

Figure 1:
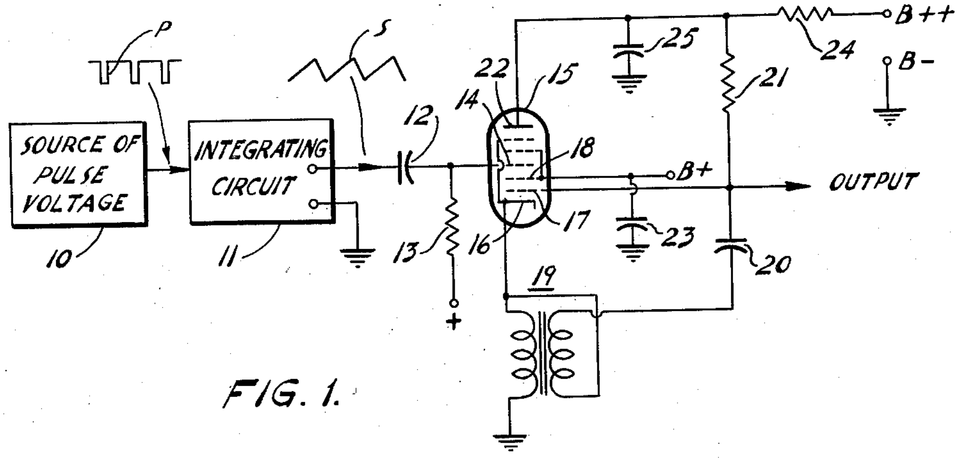

The invention herein described and claimed relates to an automatic frequency and phase synchronizing circuit for a relaxation oscillator, and in particular to an improved circuit for synchronizing a blocking-tube oscillator in frequency and in predetermined phase relationship with regularly recurring time-spaced voltage pulses which may unavoidably vary somewhat in amplitude and shape. The improved circuit utilizes the average effect of the regularly recurring pulses, rather than the individual effect of each pulse, and advantages are thereby derived, as will be described.

In a preferred embodiment of the present invention, a compact, relatively simple, circuit, employing a single tube, performs a number of functions, namely, the functions of a blocking-tube oscillator, phase discriminator, D.-C. amplifier, and automatic frequency and phase control system for synchronizing the said blocking-tube oscillator in frequency and in phase with an applied alternating voltage. The applied alternating voltage is preferably sawtooth in form; and when, as will be described, the invention is employed in a television receiver, the sawtooth voltage is derived from the incoming synchronizing pulses, as by simple integration.

The invention may be employed to advantage in television receivers to maintain the picture-tube sweep generators, vertical and/or horizontal, in synchronism with the scanning of the camera-tube at the transmitter; and as the invention utilizes the average effect of a number of incoming synchronizing pulses, the effectiveness of the novel circuit is not impaired by the presence of random noise or by other transient conditions which tend to alter the amplitude or shape of the regularly-recurring synchronizing pulses.

It is an object of the present invention to provide a simple inexpensive circuit capable of synchronizing a relaxation oscillator, in frequency and in predetermined phase relationship, with a train of regularly-recurring voltage pulses.

It is another object of this invention to provide, in a television receiver, relatively simple and inexpensive means capable of maintaining the scanning of the picture-tube at the receiver in synchronism with the scanning of the camera-tube at the transmitter, irrespective, to a large extent, of the existence of random noise or of other disturbing conditions at the receiver location.

It is another object of this invention to provide a simple inexpensive circuit capable of being employed in a television receiver to provide locally-generated voltage pulses of predetermined magnitude and shape which are locked in frequency and in predetermined phase relationship with incoming synchronizing pulses, the amplitude and shape of the locally-generated voltage pulses being substantially unaffected by variations which, due to the presence of noise or other disturbances, may occur in the amplitude and shape of the incoming synchronizing pulses.

Another object of this invention is to provide, in a television receiver, a simple compact circuit employing a single tube and capable of functioning (a) as a source of locally-generated voltage pulses, (b) as a phase discriminator and D.-C. amplifier to provide a D.-C. voltage indicative of the phase relationship between said locally-generated voltage pulses and incoming synchronizing pulses, and (c) as an automatic frequency and phase synchronizing circuit to synchronize said locally-generated voltage pulses with said incoming synchronizing pulses.

Figure 2:
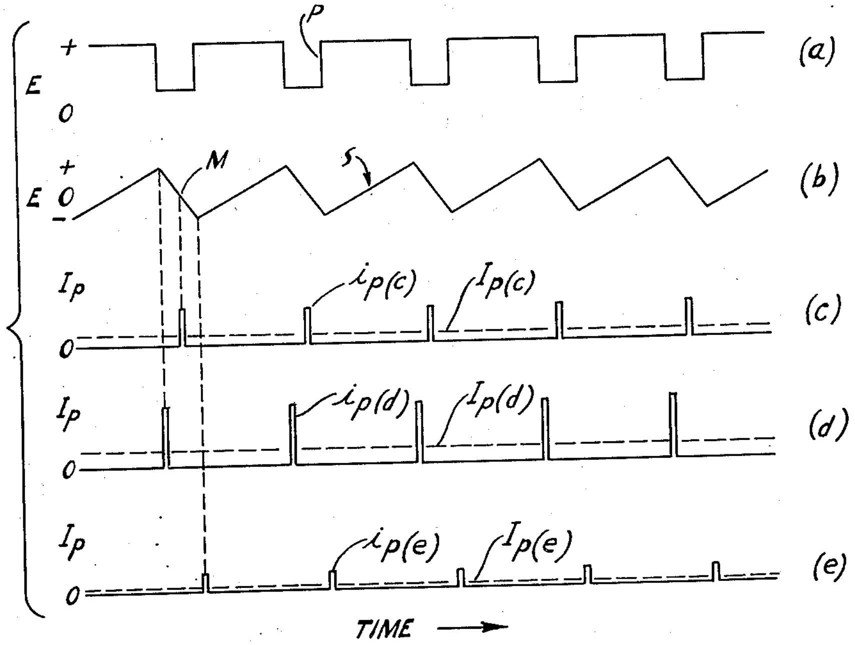
Figure 3:
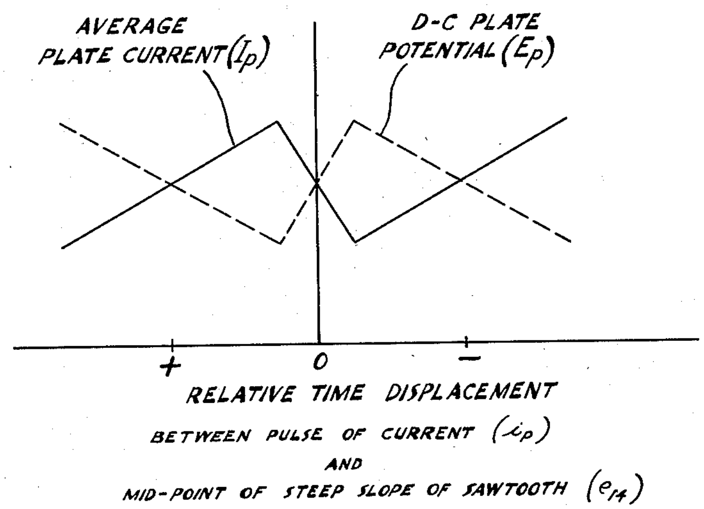
Figure 4:
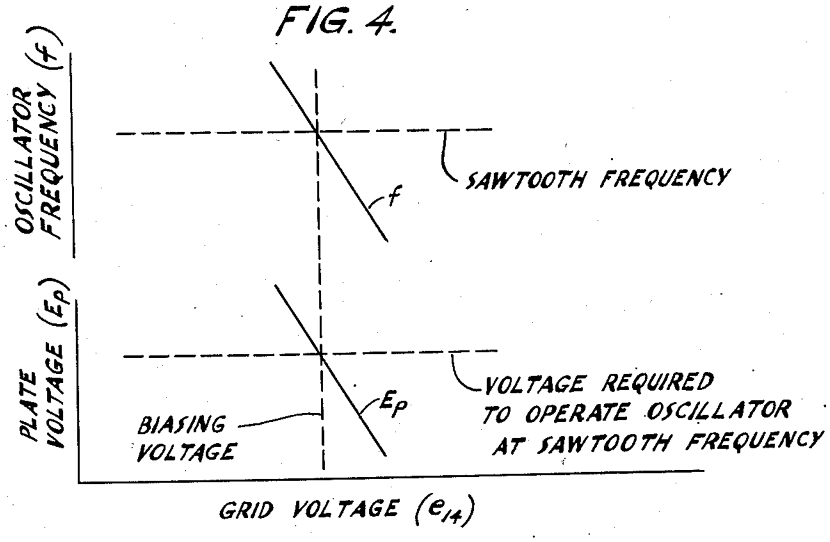

These and other objects, features and advantages of the present invention will become clear from a consideration of the following detailed description and of the accompanying drawings, wherein:

Figure 1 is a schematic representation of a preferred form of single-tube circuit embodying the invention; and Figures 2, 3 and 4 are graphical representations which will facilitate an understanding of the operation of the circuit of Figure 1.

Referring now to Figure 1, there is shown a source 10 of voltage pulses P which, when the circuit is employed in a television receiver, may be deemed to represent incoming synchronizing pulses. Source 10 is coupled to an integrating circuit 11 wherein the voltage pulses P are converted into the sawtooth voltage S. Sawtooth voltage S is applied, by way of a coupling network comprising capacitor 12 and resistor 13, to input-grid 14 of a multi-grid tube 15.

Cathode 16 and the first and second grids 17, 18 of tube 15 comprise the blocking-oscillator section of the tube. The blocking oscillator is largely conventional and includes a cathode-coupled transformer 19, a grid capacitor 20, and a grid leak 21 connected between grid 17 and plate 22 in the manner shown and for a purpose which will become clear. Grid 18 functions as the anode of the oscillator section and is connected to a source of suitable positive potential, B+. By-pass capacitor 23 is large, being of such size that grid 18 is at ground potential with respect to oscillator frequencies.

Plate 22 is connected to a source of suitable positive potential, B++, by way of load resistor 24. Plate 22 is by-passed to ground at oscillator frequencies by capacitor 25.

Input-grid 14 is connected, by way of resistor 13, to a source of biasing voltage. The magnitude of the biasing voltage is such that, when the oscillator fires, space current reaches plate 22 but grid 14 does not draw grid current. The amount of space current reaching plate 22 varies, of course, in accordance with the instantaneous value of sawtooth S.

The operation of the circuit of Figure 1 will now be described with the assistance of the graphical representations shown in Figures 2, 3 and 4.

In Figure 2 (*a*) there is shown, on an enlarged scale, the regularly-recurring time-spaced negative-going voltage pulses P delivered by source 10. When the circuit of Figure 1 is employed in a television receiver, the pulses shown in Figure 2 (*a*) are representative of the incoming synchronizing pulses, horizontal or vertical.

In Figure 2 (*b*) there is shown the sawtooth voltage wave S derived in known manner from the voltage pulses P by means of integrating circuit 11, the steep negative-slope portion of the sawtooth corresponding to the negative-going voltage pulses, and the positive-slope portion corresponding to the intervals between pulses.

In Figure 2 (*c*) are depicted pulses of plate current $i_{p(c)}$. It is assumed, in Figure 2 (*c*), that the duty cycle of the oscillator section of tube 15 is small, i. e., that the pulses of plate current are of short time-duration compared to the intervals between pulses. It is further assumed that the oscillator is operating at a frequency which coincides with the repetition frequency of the sawtooth wave S, and that the phase relationship is such that tube 15 conducts at the instant that the midpoint M of the steep negative-slope portion of the sawtooth wave S appears on input-grid 14. The average plate current obtaining under this condition is depicted by the dotted line $I_{p(c)}$.

In Figure 2 (*d*) it is assumed that the duty cycle and frequency of the oscillator section of tube 15 are the same as we assume in Figure 2 (*c*) but that the phase relationship is such that the short pulses of plate current $i_{p(d)}$ occur at an instant when the peak positive voltage of sawtooth S appears on input-grid 14. Under this condition, the magnitude of the pulses of plate current will be greater than in the case illustrated in Figure 2 (*c*), and the average plate current $I_{p(d)}$ will be larger.

In Figure 2 (*e*) it is again assumed that the duty cycle and frequency of the oscillator section of tube 15 are the same as were assumed in Figures 2 (*c*) and 2 (*d*), but in Figure 2 (*e*) the phase relationship is such that the short pulses of plate current $i_{p(e)}$ occur when the instantaneous voltage on input-grid 14 corresponds to the minimum amplitude of the sawtooth wave. Under this condition, the magnitude of the pulses of plate current will be smaller than in Figures 2 (*c*) or 2 (*d*), and the average plate current $I_{p(e)}$ will also be smaller.

Figures 2 (*c*), 2 (*d*) and 2 (*e*) illustrate three representative phase conditions, from which it will be readily apparent that the magnitude of the average plate current $I_p$ is a function of the phase relationship existing between the pulses of plate current $i_p$ and the instantaneous sawtooth voltage $e_{14}$ appearing on input-grid 14. This relationship is shown graphically in Figure 3. In Figure 3 the time-displacement, or phase angle, between the center of the pulse of plate current $i_p$ and the instantaneous sawtooth voltage $e_{14}$ is assumed to be zero when the center of the pulse occurs at the instant that the grid voltage corresponds to the mid-point M of the steep negative slope of the sawtooth. If the center of the pulse of plate current $i_p$ occurs prior to the mid-point M, the time-displacement or phase angle is indicated, in Figure 3, as being positive; and if the center of the pulse occurs later than the mid-point, the time-displacement is indicated as being negative. It will be seen from the graph in Figure 3 that if the pulse of plate current $i_p$ occurs early, the average plate current $I_p$ will tend to increase, whereas, if the pulse $i_p$ occurs late, the average plate current will tend to decrease.

In the circuit of Figure 1, the R. C. time-constant of resistor 24 and capacitor 25 is long with respect to the time intervals occurring between pulses of plate current, and a D.-C. potential is developed on plate 22 which is a function of the average plate current $I_p$. The relationship between average plate current $I_p$ and D.-C. plate potential E is shown graphically in Figure 3.

The fixed constants of the circuit of Figure 1 are so selected that the oscillator operates at a frequency equal to the repetition frequency of the sawtooth voltage S when the potential on grid 14 is equal to the positive biasing voltage applied thereto by way of resistor 13. With sawtooth voltage S applied to grid 14, there are two instants in each cycle when the grid voltage $e_{14}$ equals the preselected biasing potential. These two points occur, of course, at the mid-points of the positive and negative slopes of the sawtooth.

The circuit shown in Figure 1 is so constructed and arranged that the center of the pulse of plate current, irrespective of the duration of the pulse, tends to occur at the mid-point of the negative slope of the sawtooth, and conversely, the center of the resting period, or period of non-conduction, tends to occur at the mid-point of the positive slope. It will therefore be seen that, if the negative slope of the sawtooth correspond to the incoming synchronizing pulses, which are to be reproduced by the circuit of Figure 1, and if the circuit is arranged to deliver an output pulse which is derived from the pulse of plate current, then the circuit of Figure 1 may be said to be in a condition of stable equilibrium when the pulse of plate current, i. e., the center of the pulse of plate current, occurs at the instant that the mid-point of the negative slope of sawtooth S appears on grid 14. This will become clear as the description proceeds.

As will be readily understood by those skilled in the art, the frequency of the oscillator section of tube 15 depends upon the magnitude of the positive potential to which oscillator control grid 17 and the upper plate of grid-capacitor 20 are returned after the blocking-tube oscillator is cut off. In the circuit of Figure 1, grid 17 is returned by way of grid leak resistor 21, to the potential of plate 22; and as shown graphically in Figure 3 and described above, the D.-C. potential $E_p$ of plate 22 is a function of the average plate current $I_p$, which in turn is a function of the phase relationship or time-displacement existing between the occurrence of the pulses of plate current $i_p$ and the instantaneous sawtooth voltage $e_{14}$ The circuit of Figure 1 is so operated that if, at the instant the pulse of plate current occurs, the potential on grid 14 is equal to the preselected biasing voltage, the average plate current $I_p$ is of proper magnitude to develop on plate 22 a D.-C. potential $E_p$ having a magnitude equal to that required to maintain the blocking oscillator at the sawtooth frequency. This is represented graphically in Figure 4 where the grid potential $e_{14}$ is plotted against the D.-C. plate potential $E_p$, and against the oscillator frequency, $f$. It will be seen that as the grid voltage $e_{14}$ becomes more positive than the preselected biasing voltage, the D.-C. plate potential $E_p$ becomes less positive, and the frequency of oscillation becomes lower than the sawtooth frequency; and as the grid voltage $e_{14}$ becomes less positive than the preselected biasing voltage, the D.-C. plate potential $E_p$ becomes more positive, and the frequency of oscillation becomes higher than sawtooth frequency.

As will now be readily understood, if the blocking-tube oscillator fires earlier than at the mid-point M of the steep negative slope of the sawtooth S, the D.-C. potential developed on plate 22 tends to be less positive than required to operate the oscillator at the sawtooth frequency and the oscillator will tend to fire at lower-than-sawtooth frequency. On the other hand, if the oscillator fires later than the mid-point of the steep negative slope of the sawtooth, the D.-C. potential developed on plate 22 tends to be more positive than required to operate the oscillator at the sawtooth frequency and the oscillator will tend to fire at higher-than-sawtooth frequency.

To facilitate the first portion of the description, it was assumed above, in connection with Figure 2, that the blocking oscillator was operating at sawtooth frequency and was merely, in Figures 2 (*d*) and 2 (*e*), out of phase therewith. It will now be understood, however, that whether or not the oscillator is operating at sawtooth frequency, the circuit of Figure 1 develops voltages which pull the oscillator toward in-phase operation at the preselected sawtooth frequency, and that a condition of stable equilibrium does not exist until the oscillator is so operating at sawtooth frequency that the pulses of plate current $i_p$ occur at the instant that the mid-point of the steep negative slope of the sawtooth appears on grid 14. And, since the mid-point of the steep negative slope of the sawtooth corresponds to the center of the regularly-occurring time-spaced pulses P, the oscillator is urged to fire in synchronism and in phase with the pulses P.

When the circuit of Figure 1 is employed in a television receiver, the pulses P will represent pulses derived from the horizontal, and/or the vertical, synchronizing pulses picked up by the receiver. Variations which unavoidably occur in the magnitude, and/or shape, of the incoming synchronizing pulses do not change the conditions under which stable equilibrium is established for the blocking oscillator of the circuit of Figure 1. Irrespective of variations in the magnitude and/or shape of the incoming synchronizing pulses, the blocking oscillator of the circuit of Figure 1 will continue to tend to fire at a time when the instantaneous potential on grid 14 is that of the center-point of the negative slope of the sawtooth wave. Variations in the magnitude and shape of the incoming pulses affect only the magnitude of the voltages which are developed by the circuit of Figure 1 to pull the oscillator toward the condition of stable equilibrium, and consequently only affect the rapidity with which the oscillator is brought into synchronism.

To facilitate the description, the pulses of plate current were represented graphically in Figure 2 as being of very short duration, i. e., of substantially shorter duration than the incoming pulses P from which sawtooth S is derived. However, when the circuit of Figure 1 is employed in a television receiver, the blocking-tube oscillator may conveniently have a duty cycle such that the pulses of plate current have a duration equal to that of the pulses P from which sawtooth S is derived. As a matter of fact, if the output pulse of the circuit be defined as the pulse corresponding to the conduction period of the tube, the duration of the pulse of plate current is immaterial. For, it will be seen that, if the center of a relatively wide pulse of plate current be coincident with the peak amplitude of sawtooth S, the average magnitude of the current in the pulse will be maximum, while, if the center of the pulse be located at the point of minimum sawtooth voltage, the average magnitude of the current in the pulse will be a minimum; and, when the center of a wide plate-current pulse coincides with the mid-point M of the negative slope of the sawtooth wave, the average magnitude of the current in the pulse will equal that required to develop a D.-C. potential on plate 22 necessary to maintain the blocking oscillator firing at the preselected sawtooth frequency. The operation of the circuit of Figure 1 is therefore not dependent upon the blocking oscillator having a small duty cycle.

When the circuit of Figure 1 is employed in a television receiver, the duty cycle of the oscillator will ordinarily be small, the output pulse will correspond to the pulse of plate current, i. e. to the conduction period, and the point of stable equilibrium will be located on the negative slope of the applied sawtooth voltage.

I have shown, in Figure 1, a simple inexpensive circuit for synchronizing a local blocking-tube oscillator in frequency and in phase with incoming voltage pulses, which, in the case of a television receiver, are derived from the synchronizing pulses transmitted by the television transmitter. In the circuit shown and described, a single tube functions as a blocking oscillator, phase detector and D.-C. amplifier to develop a D.-C. voltage indicative of the phase relationship existing between the locally-generated voltage pulses and the incoming synchronizing pulses; and the D.-C. voltage thus developed is utilized to operate the local blocking-tube oscillator at the frequency of the incoming voltage pulses and in phase therewith, irrespective of variations which may unavoidably occur in the amplitude and shape of the incoming pulses.

Having described a preferred embodiment of my invention, I claim:

1. A combination automatic frequency control circuit and relaxation oscillator comprising: a source of alternating voltage with which it is desired to synchronize said relaxation oscillator, each cycle of said voltage including a sloping wave portion of substantial extent; a vacuum tube having a cathode, an anode, and first, second, and third grids; a load resistor connected between said anode and a source of anode current; means for operating said cathode, first grid and second grid as a relaxation oscillator, said means including transformer means for regeneratively coupling the first grid-cathode and second grid-cathode circuits of said tube and a grid-capacitor grid-leak combination comprising a grid capacitor connected in said first grid-cathode circuit and a grid leak connected between said first grid and the junction of said load resistor and said anode, the constants of said relaxation oscillator being so adjusted that anode current flows only in short pulses; and means coupling said source of alternating voltage to said third grid whereby the magnitude of the space current pulses reaching said anode is made a function of the amplitude of said alternating voltage during the brief interval of anode current flow.

2. A combination automatic frequency control circuit and relaxation oscillator as claimed in claim 1, characterized in that the alternating voltage applied to said third grid is of sawtooth waveform.

3. The combination claimed in claim 1, characterized in the provision of a capacitor connected in shunt relation with said load resistor, the time constant of the combination of said capacitor and said resistor being long compared to the period of said alternating voltage.

4. A single-stage single-tube circuit constructed and arranged to function as a blocking oscillator, phase discriminator and automatic frequency and phase synchronizer, said circuit comprising: a source of periodic voltage; a tube having a cathode, a plate, and at least first, second and third grids; a source of direct-current plate voltage; means for connecting said source of plate voltage to said plate; a source of substantially fixed biasing voltage connected to said third grid; means for operating said cathode, first grid and second grid as a blocking oscillator, said last-named means including transformer means for regeneratively coupling the first grid-cathode and second grid-cathode circuits of said tube and a grid-capacitor grid-leak combination, said grid capacitor being connected in said first grid-cathode circuit and said grid leak being connected between said first grid and said plate of said tube, the circuit constants of said single-tube circuit being so selected that said oscillator fires and space current flows in short pulses between said cathode and said plate at a frequency substantially equal to that of said periodic voltage; means for applying said periodic voltage to said third grid; and a bypass capacitor having negligible impedance at the frequency of said periodic voltage connected between said plate and ground.

5. A single-stage single-tube circuit as claimed in claim 4 characterized in that said periodic voltage applied to said third grid is of sawtooth waveform.

6. A single-stage combination relaxation oscillator and automatic frequency and phase control system comprising: a source of periodic voltage wave having a frequency equal to the desired frequency of said oscillator; an electron discharge device having a cathode, a plate, and at least first, second and third grids; means for applying a substantially fixed biasing potential to said third grid; means for operating said cathode, first grid and second grid as a blocking oscillator, said means comprising means for regeneratively coupling the first grid-cathode and second grid-cathode circuits of said tube, and a storage-reactance discharge-resistor combination, said storage reactance being connected in said first grid-cathode circuit and said discharge resistor being connected between said first grid and said plate; means for applying said periodic voltage wave to said third grid; and filter means connected in the plate-cathode circuit of said tube for maintaining said plate at a substantially steady potential which varies as a function of the direct-current component of space current flowing between said cathode and said plate, the circuits constants of said system being so selected that when the potential on said third grid is equal to said fixed biasing potential the direct-current plate potential applied to said first grid by way of said discharge resistor is of a value to effect operation of said blocking oscillator at said desired frequency.

7. A single-stage combined relaxation oscillator and automatic frequency and phase control system as claimed in claim 6 characterized in that said periodic voltage wave is of sawtooth waveform.

8. Apparatus as claimed in claim 7 characterized in that said sawtooth voltage wave is derived from time-spaced synchronizing pulses.

ROBERT C. MOORE.

REFERENCES CITED

The following references are of record in the file of this patent:

UNITED STATES PATENTS

| Number | Name | Date |
|---|---|---|
| 2,125,732 | Bowman-Manifold et al. | Aug. 2, 1938 |
| 2,250,708 | Herz | July 29, 1941 |
| 2,284,337 | Mulert et al. | May 26, 1942 |
| 2,416,306 | Grieg | Feb. 25, 1947 |

FOREIGN PATENTS

| Number | Country | Date |
|---|---|---|
| 425,035 | Great Britain | Mar. 4, 1935 |